United States Patent [19]

Mutschler, III et al.

[11] Patent Number: 5,940,075

[45] Date of Patent: Aug. 17, 1999

[54] METHOD FOR EXTENDING THE HYPERTEXT MARKUP LANGUAGE (HTML) TO SUPPORT ENTERPRISE APPLICATION DATA BINDING

[75] Inventors: Eugene Otto Mutschler, III; Joseph Peter Stefaniak, both of San Clemente, Calif.

[73] Assignee: Unisys Corp., Blue Bell, Pa.

[21] Appl. No.: 08/941,437

[22] Filed: Sep. 30, 1997

[51] Int. Cl.[6] ........................................ G06F 3/00
[52] U.S. Cl. .............................. 345/335; 345/356
[58] Field of Search ...................... 345/335, 356, 345/357, 327, 326, 328, 329, 330–334, 336, 337–338, 339, 340–347, 398–399; 348/352–355, 466; 707/102–103, 500–514

[56] References Cited

U.S. PATENT DOCUMENTS

| | | | |
|---|---|---|---|
| 5,760,771 | 6/1998 | Blonder et al. | 345/336 |
| 5,774,123 | 6/1998 | Matson | 345/357 |
| 5,812,134 | 9/1998 | Pooser et al. | 345/356 |
| 5,821,937 | 10/1998 | Tonelli et al. | 345/356 |
| 5,844,552 | 12/1998 | Gaughan et al. | 345/327 |
| 5,864,866 | 1/1999 | Henckel et al. | 707/103 |
| 5,877,744 | 3/1999 | Caskill | 345/146 |
| 5,877,766 | 3/1999 | Bates et al. | 345/357 |

OTHER PUBLICATIONS

*Inside OLE2,* Brockschmidt, Microsoft Press, Redwood, Wa, 1994.

Lutus, *Dynamic Linking Libraries,* , 1997.

*Primary Examiner*—Steven P. Sax
*Attorney, Agent, or Firm*—J. Ronald Richebourg; Steven R. Petersen; Mark T. Starr

[57] ABSTRACT

A method operating in a computing system that has at least one server and a multiplicity of clients coupled thereto. The server has a CPU executing a Web Server program and a repository coupled thereto for storing description language of a Form to be displayed. The server is coupled to a host having a CPU executing a legacy application containing the Form. At least one of the clients executes a Web browser program. The method of the present invention operates in the server and the client for supporting enterprise application data binding. The method in the server includes the steps of opening the Forms and requesting a first Form and associating data names with data values received from the host and sending them to the client. The client then locates a corresponding GUI Control and makes an association between each of the data names and a corresponding GUI Control and obtains the contents of each of the corresponding GUI Controls associated with a data name and places data value/data name into a buffer, Next, the server processes the contents of the buffer and sends it to the host, whereby the GUI Controls are displayed containing values and states from the Form.

18 Claims, 18 Drawing Sheets

WELCOME TO TRIPS

EMPLOYEE SSN         : [          ] ← 20

LAST NAME            : [          ] ← 24

APPROVER PASSWORD:     [          ]

'X' TO SELECT -OR- '?' FOR HELP

☐ INQUIRE ON TER                    ☐ INQUIRE ON FAR/FTR RATES

☐ CREATE A TER                      ☐ INQUIRE ON STATEMENT (MMYY)

☐ CREATE A TRAVEL AUTH./ADVANCE     ☐ COMPLETE, CORRECT OR DELETE A TER

☐ APPROVE TRAVEL ACTIVITY           ☐ APPROVER ADMIN FUNCTIONS

☐ EXIT TRIPS                        ☐ TRIPS NEWS UPDATED 12/09/96

☐ TRIPS COMMENTS

THE NEXT DIRECT DEPOSIT WILL BE FRIDAY, DECEMBER 13, 1996
THE NEXT DIRECT AMEX CREDIT CARD PAYMENT WILL BE DECEMBER 23, 1996

[ TRANSMIT ] ← 28

*FIG. 3*

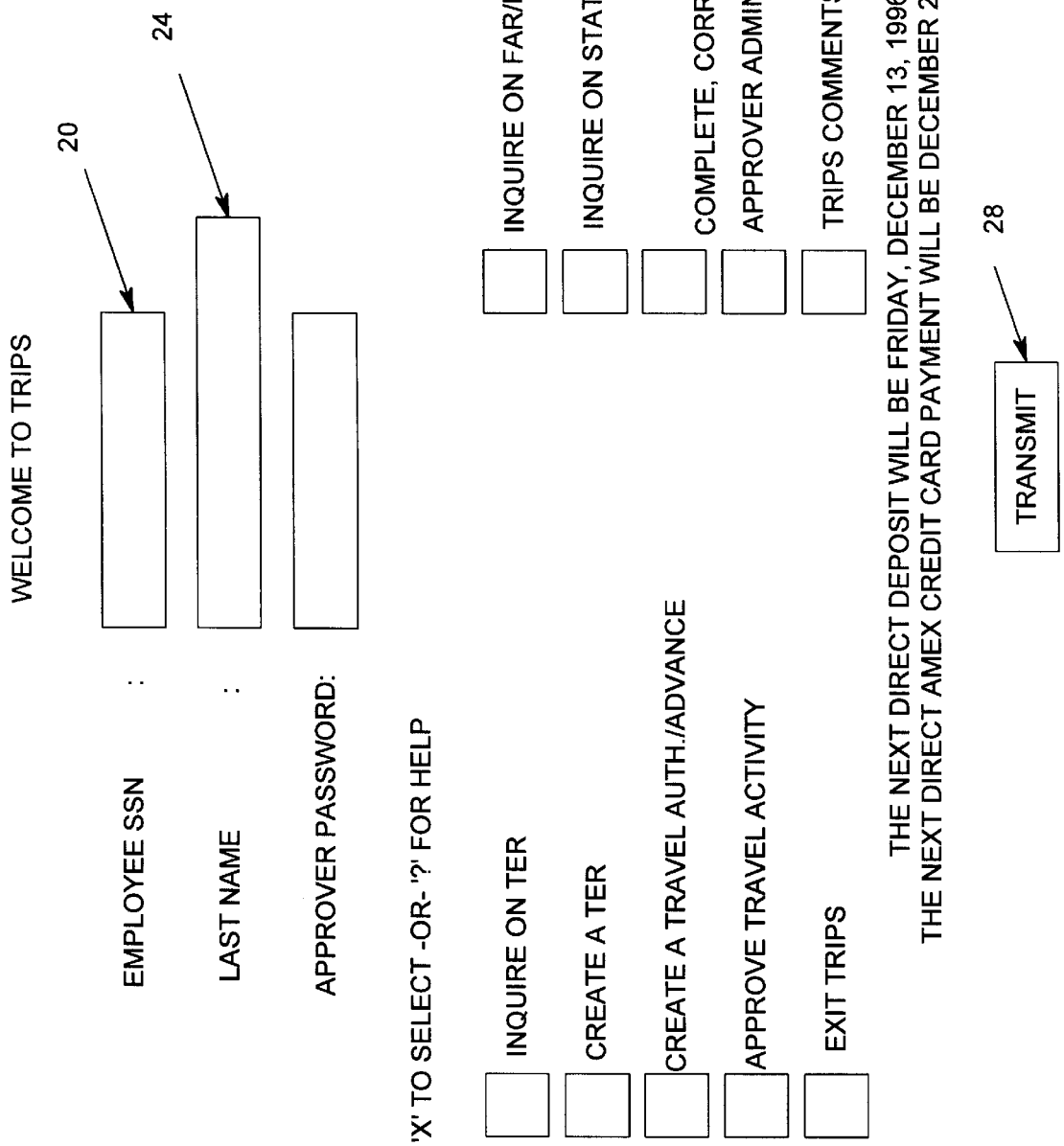

METHOD FOR EXTENDING THE HYPERTEXT MARKUP LANGUAGE (HTML) TO SUPPORT ENTERPRISE APPLICATION DATA BINDING

CROSS REFERENCE TO RELATED PATENT APPLICATIONS

This application relates to the following copending applications, assigned to the same assignee hereof, which are incorporated herein by reference.

U.S. Ser. No. 08/941,436, entitled A METHOD FOR DYNAMICALLY EMBEDDING OBJECTS STORED IN A WEB SERVER WITHIN HTML FOR DISPLAY BY A WEB BROWSER; and U.S. Ser. No. 08/941,438, entitled A METHOD FOR EXTENDING HYPERTEXT MARKUP LANGUAGE (HTML) TO SUPPORT. A GRAPHICAL USER INTERFACE CONTROL PRESENTATION.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to client/server computing in a World Wide Web ("Web") environment, and more particularly to a method for supporting enterprise application binding within a Web Browser.

BACKGROUND OF THE INVENTION

With the rising popularity of client/server computing and the Web, businesses are looking for even better ways to increase their competitive advantage. Information is one of businesses most precious commodities. Accordingly, there is a need for flexibility to position information in ways that best support business organizations and their customers.

Client/server technology offers graphical user interfaces (GUI's) a choice of open systems, rapid application development, increased end-user productivity and much more. By combining this technology with the Internet and intranets, a powerful system is made available to distribute information throughout the business and customer communities. The world Wide web is a purely client/server environment that can bring business to customers. Even if a business has information that needs to be kept within the organization, the Web technology is still available as an Intranet, which is a web site behind a firewall and made available only to employees of the organization. The term "firewall" as used herein refers to a combination of hardware and software that prevents access to secured data over a network. The idea is to protect a cluster of more loosely administered machines hidden behind the firewall from hackers.

There is also a need to make the move to client/server and Internet technologies without having to migrate from existing host applications. The best way to build new client/server applications that can be integrated with current applications is to combine the dependability of enterprise-wide computing systems with the flexibility of distributed processing.

Early attempts at capitalizing on the advantages of the client/server applications involved the use of the PC as a "dumb terminal", or a character-based network terminal, that interacted directly with legacy programs operating on a mainframe or host computer. This approach was unsatisfactory because the user was limited to a character-mode display. Later attempts included such solutions as the Designer Workbench product (which is a software tool now referred to as PowerClient and available from Unisys Corporation, assignee of this patent). The PowerClient product gives the user the ability to capture Forms descriptions that are on the mainframe, and to convert character-based fields into Windows-based visual elements such as edit fields, buttons, etc. A language called SCL (Screen Control Language) was created for describing the visual elements as well as indicating processing that will be performed on the client PC's.

With reference to various types of legacy programs operating on the host, LINC (i.e., "Logical Information Network Compiler") allows Screen Control Language ("SCL") to be generated directly. SCL is created with the use of the PowerClient product for third generation languages (3GL) such as COBOL or ALGOL legacy programs; and, in the case of MAPPER, which is a third system and language for legacy programs, there is no way to generate SCL. For MAPPER, the user must use a forms designer tool (such as the Development Studio product) for drawing visual elements to generate the required SCL that matches the MAPPER application.

More recently, it was possible to take SCL definitions of a Form and turn them into a Visual Basic or a PowerBuilder executable program. For an amplification of this method reference is made to a copending patent application entitled A METHOD FOR GENERATING CODE FOR MODIFYING EXISTING EVENT ROUTINES FOR CONTROLS ON A FORM, Ser. No. 08/803,137, filed Feb. 19, 1997 by the same inventors hereof and assigned to the same assignee hereof. PowerBuilder is a product of PowerSoft Company (which has recently merged with Sybase, Inc. of Emeryville, Calif.), and Visual Basic is a product of Microsoft Corporation of Redmond, Wash. However, since the Visual Basic and PowerBuilder client builder products generate executables, there is no way to incorporate the presentation functionality they provide into a Web browser, which is a client-side software module for accessing a Web server.

The PowerClient product has the capability of displaying forms from legacy host applications in the PC environment. While it is possible to display forms in their original, character-based format, it is also possible, via the PowerClient Development Studio product, to add modern GUI Controls, such as command buttons, list boxes and images to these forms. The Forms thus developed are stored in the PowerClient product environment and are accessed and displayed as needed when the user is interacting with the legacy application. The initial data received from the legacy application for the Form is displayed, and then the user of the legacy application enters data into the GUI Controls contained in the Form. When the user completes the interaction, the PowerClient product gathers the data from these GUI controls into a buffer and formats it for transmission to the host in such a way that the legacy host application can continue to use its character-based interface and is unaware of these changes. The host legacy application then supplies the initial data for the next Form, and the process repeats.

In order to "Web-enable" such a legacy application, i.e. allow it to work within the World Wide Web internet or intranet environment, it is necessary that: 1) the host application continue to be unaware that an agency is intervening in the display of its Forms and 2) these Forms need to have a "look and feel" similar to the PC version in order that development and training costs be minimized.

The current state of the art for displaying Forms in the World Wide Web is the Hypertext Markup Language (HTML). This language is an instance of SGML (Standard Generalized Markup Language). HTML has the concept of the FORM, which is a means of displaying GUI controls for user interaction. When the user submits the HTML Form, the contents of these controls are gathered by the Web browser and sent as part of a Universal Resource Locator (URL) sent to the Web server in the form of control name/control value pairs.

The HTML FORM construct was originally considered for implementation of PowerClient product Forms in the web environment and considerable effort was expended in an effort to make it work. However, it was ultimately found that there were numerous shortcomings of this approach, foremost of which is the inability to simultaneously specify the caption for a control and the name of the host data element with which it is associated. This limitation made it impossible to use the HTML FORM construct to support PowerClient product legacy forms in the web environment. Moreover, while the set of available components included most of the PowerClient product's GUI Control set, there were still some which either were not supported or were of limited functionality vis-a-vis the PowerClient product set. Additionally, there was no way to control where on the Form the control was positioned. HTML Version 2.0 added the concept of FRAMEs, which gives some control over positioning. These were evaluated for the PowerClient product's environment and found insufficient to control locations on the PowerClient product Form.

SUMMARY OF THE INVENTION

It is therefore an object of the method of the present invention to provide an evolutionary approach to client/server technology so that a user can retain their existing information technology investment in legacy programs, yet move to client/server computing on the Web. A user can increase productivity and reduce development and training costs because using the present invention does not require any changes to the legacy programs.

A feature of the present invention is that the generated SCL is dynamically embedded within the HyperText Markup Language (HTML) for each legacy Form.

Another feature of the present invention is that Form data from a host legacy application can be associated with GUI controls on a Form displayed in the Web environment.

Yet another feature of the present invention is that Form data can be obtained from GUI Controls in the Web environment and returned to a legacy host application.

An advantage of the present invention is that a user is able to turn off the HTML presentation altogether and effectively use the browser as a transport layer for other ClientBuilder product applications with the data binding functionality. Moreover, a user can hide the browser and execute a Visual Basic application, which would communicate with the browser and the user never sees the browser.

Another advantage of the present invention is that the SCL can set various states of GUI Controls and associate data with them. The current state of the HTML has a limited subset of what is doable in terms of data logic handling.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

FIG. 3 is a print of a computer screen display of the same Form for TRIPS after adding visual controls using the Development Studio.

FIG. 4 is a print of a computer screen display after employment of the method of the present invention.

FIGS. 6A through 6K (intentionally omitting "6II") illustrate a run-time process that includes the steps performed by the method of the present invention.

DETAILED DESCRIPTION OF ONE EMBODIMENT

Figure 1:
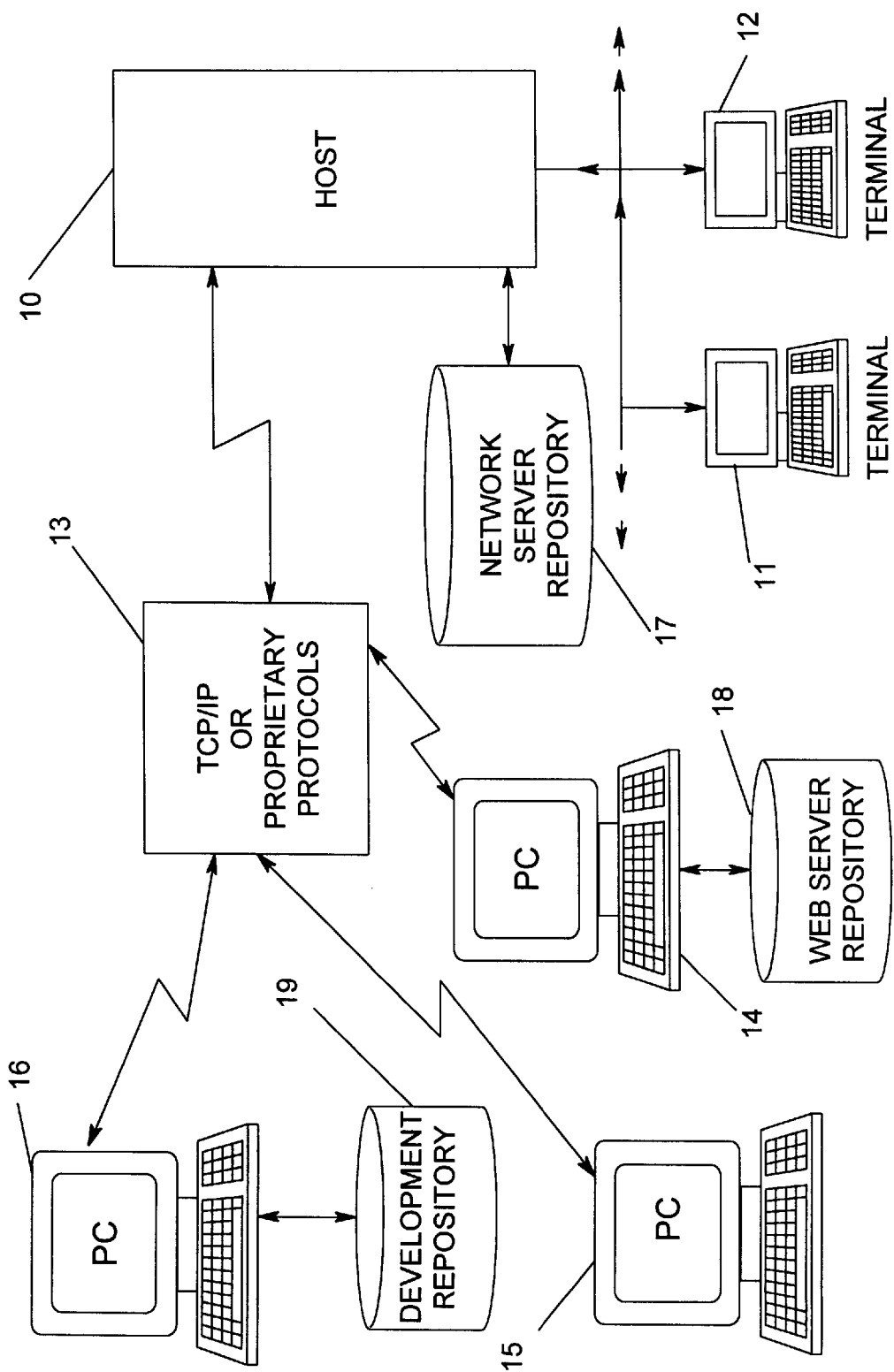
FIG. 1 is a block diagram of a system that could be used to develop files and to execute the same employing the steps of the method of the present invention.

The present invention integrates the popular Web browsers with legacy applications in order to provide Form presentation capabilities not supported using HTML, which is today's most popular Web language. This means that one can create a unified GUI front-end "look and feel" for even the most complex applications. The disclosed method is ideal for building and interfacing powerful desktop client applications with 3GL and LINC legacy applications.

The SCL language is used by the PowerClient product to control the display of Forms in the PC environment. Since this language completely characterizes a legacy Form for the purposes of display in the normal PC environment, including the legacy host application data field with which each GUI element is associated, a decision was made to use it as the means by which the Form is displayed in a Web browser. SCL Text is embedded into an HTML page for display in a Web browser environment, and the data entered by the user is returned to the legacy application.

In order to display embedded HTML and communicate with the legacy application on a host, two cooperating programs are required. For the Web browser environment, an ActiveX control was developed and is referred to herein as SCL Web Control ("SWC") program. The SWC program is an ActiveX compliant control used to communicate with either a Netscape or Microsoft Web browser. ActiveX is a software technology sponsored by Microsoft Corporation.

ActiveX controls are invoked in the browser environment by a particular HTML construct (the OBJECT tag). To generate an HTML page with the OBJECT tag, a program was developed that can be invoked by a Web server, which is referred to herein as a Web Agent program. The Web Agent program also communicates with the legacy host application to act as a communications switch for data going from the host application to the SWC program for display to the user and from the SWC program to the host application when the user submits the Form.

The OBJECT tag construct allows the passing of parameters to an ActiveX control when it is invoked. Therefore, SCL Text is included for a legacy Form as one of the parameters to the SWC program. A second parameter to the SWC program is the initial data for the Form received from the host legacy application. The SCL Text passed to the SWC program contains GUI Control specifications. A part of each such specification is the name of the host legacy application data element with which the GUI control is associated.

The SWC constructs a set of GUI Controls corresponding to the GUI Control specifications in the SCL Text. Using the part of each such specification that indicates which application data field with which the control is associated, it places initial data from the initial data list into the GUI control. The initial form data is in the format of name/value pairs, where the name is that of a legacy application data element, so it is necessary for the control to make an association between this data name and the GUI Control.

When the user completes interaction with the Form, the SCL Web Control acts much as it does in PowerClient in that it gathers data from those GUI Controls associated with Data Names and formats it for return to the host legacy application. In this case, since the environment is the Web, the formatting is different than in the PowerClient product. The GUI Control-data name associations are used to locate those controls containing data for the legacy application. These values are extracted from the GUI Controls. A URL is then constructed, containing name/value pairs, where the name is the application Data Name. The URL also contains information about the name of the Form and its host application. The URL is sent to the Web Agent program, which reformats the URL into the normal PowerClient product host application data buffer as described in a problem statement.

At this juncture of the description several definitions are added to assist in the understanding of the present invention.

Application shall mean a program written by a user which accomplishes some operation.

Command shall mean an instruction to perform an operation. In the Web Agent (defined hereafter) context, the Command operation is to obtain ("Open") a host Form or to send the results of an entry of data into the Form back to the application ("Transmit").

Data Name shall mean the name of a host application datum. That is, is the identification given to a field on a host screen.

Data Value shall mean the value of a host application datum. That is, the value associated with a field on a host screen.

Form shall mean the visual display elements of an application containing fields for entry and display of the application.

GUI Control shall mean a visual element of a GUI display, such as an edit box or a list box. Other examples include buttons, list boxes, check boxes and combo boxes.

Host Reply Definition (HRD) shall mean a file used in the PowerClient 3GL environment that maps characters in the data stream from the host with the fields and their Data Names in the modernized Form.

Partition or Partition Name shall mean a space in a repository, thereby providing a means for categorizing data in the repository. In particular, it shall mean a name given to represent a series of Forms associated with a 3GL/LINC (i.e., Legacy) application.

Repository Object shall mean such things as SCL Text (defined hereafter), list box data, an image, etc.

SCL Construct shall mean a valid production of the SCL language's grammar, i.e., an SCL Text (defined hereafter) statement.

SCL Control shall mean an SCL Construct that describes a particular GUI Control, such as an edit field, list box, etc.

SCL Web Control shall mean an ActiveX based control used in a PowerClient run-time environment.

SCL Text shall mean a collection of SCL Constructs. SCL is a Unisys proprietary language. SCL Text is used to describe GUI Controls to be rendered within a browser.

SCL Files shall mean those files that contain SCL Text, which are referred to as an object in a repository.

Script shall mean a sequence of instructions used to establish connectivity with a host computer and a specific application of the host.

Uniform Resource Locator (URL) shall mean an identifier for locating a resource on the Web.

Web Agent shall mean the PowerClient module that interprets special URL requests passed to it by the Web Server (defined hereafter). It uses information in the special URL to obtain data from the host for a particular Form and returns it to the Web Control via the Web Server and Web browser. It is also a series of both client/server components that permit LINC/3GL applications to have access over the Web.

Workstation Driver File (WDF) shall mean a file used in the PowerClient LINC environment that maps characters in the data stream from the host with the fields and their Data Names in the LINC Form.

Referring now to FIG. 1, a client/server system configuration is illustrated wherein a host or mainframe 10 has terminals 11 and 12 coupled thereto and network connection 13 coupling to clients 14, 15 and 16. The network connection 13 may typically comprise a TCP/IP or any other proprietary protocol. The host 10 could be any computing system capable of operating in a client/server environment, such as for example any Unisys or IBM computer. The host 10 is coupled to a network server repository 17, the client 14 (also referred to herein as an NT Web Server) is connected to a client repository 18; and, the client 16, which in the illustrated embodiment is used for development, is coupled to a development repository 19. The clients 14, 15 and 16 could typically be any currently available PC capable of executing the Windows 95 or NT operating system. However, it is required that the client 14 be able to execute the Windows NT operating system.

The host 10 is capable of executing software programs including LINC and 3GL legacy programs. The client 14 is capable of executing software programs including INFO-Connect (transports), PowerClient and Web Agents. The client 15 is capable of executing software programs such as SCL Web Control and Web browsers. The client 16 is capable of executing software programs such as PowerClient and INFOConnect. In addition to those programs alluded to hereinabove, the client 16 is capable of executing many of the more popular and widely-used programs such as PowerBuilder and Visual Basic.

The Web Server repository 18 stores Forms that are distributed to clients using Web browsers. The repository 18 is the database that contains LINC Form objects, image objects, Script files and data files that are down-loadable from the host system, as required.

The network server repository 17 holds host application Forms, and it provides version control for Development Studio Forms.

The Development Repository 19 is used as a database for the development process and in particular stores LINC Form objects, image objects, data files and scripts. Moreover, the development repository 19 contains the objects and scripts necessary to develop and properly display Forms in the Web browser. As one begins modernizing their applications, developers can take advantage of the repository 19 to share tasks. When a new Form is stored in this repository, it is immediately available to other development environment users.

The INFOConnect program includes three parts of a suite that runs with PowerClient, and they are the Unisys MT Emulator, the UTE Emulator and the IBM 3270, all of which are available from DCA, Inc., of Cincinnati, Ohio. Power-Client is a program available from Unisys Corporation of Blue Bell, Pa., assignee of the present invention. PowerClient includes 10 components: Code Generation Assistants (two), 3GL Work Bench, LINC Work Bench, MAPPER, Development Studio, Repositories on the Mainframe (two), CBT and Web Agent.

Figure 2:
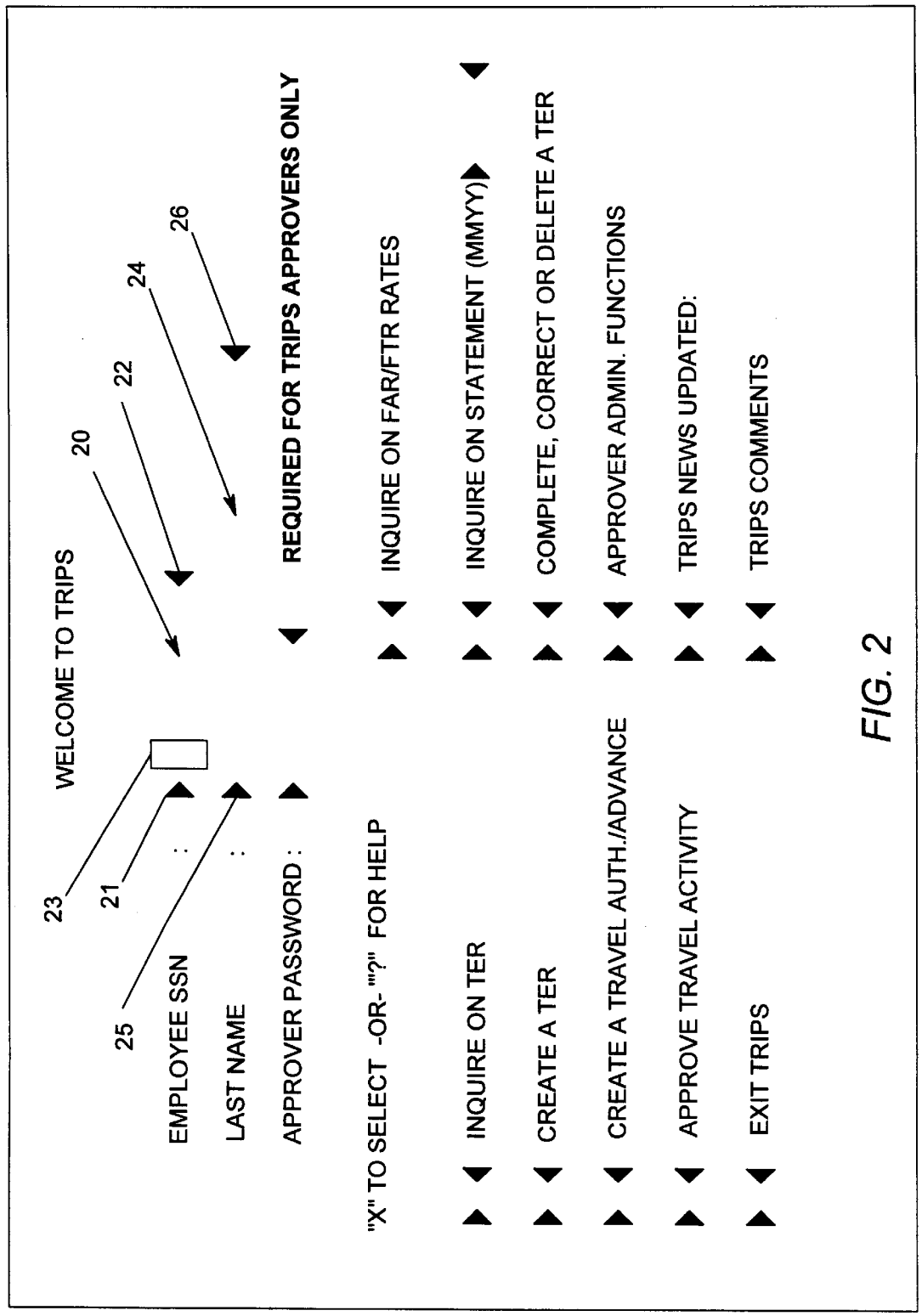
FIG. 2 is a print of a computer screen display from a 3GL legacy application Form for TRIPS, a report for tracking employee expenses, which is convertible by using the method of the present invention.

Referring now to FIG. 2, a print of a screen display of a Form for a 3GL legacy application is illustrated. When a client user calls up the INFOConnect and logs onto the server and specifies TRAVEL, this particular Form entitled TRIPS appears on the screen. It is a typical Form to be completed by an employee of an organization for reimbursement of travel expenses. Each field of this Form is depicted by a space between opposing arrowheads. For example, the field entitled EMPLOYEE SSN is that space 20 between opposing arrowheads 21 and 22, and includes a display screen cursor 23. The next field LAST NAME is that space 24 between opposing arrowheads 25 and 26. The remaining fields of the Form are similarly depicted. There are a total of fifteen (15) fields on this Form.

Preparatory to modifying the TRIPS Form using the method of this invention, the user captures this Form using the combined facilities of the INFOConnect Emulator and the PowerClient Development Studio (PDS). The user then creates Data Names for each field of the Form. SCL syntax will contain each of the Data Names created. For example, for the Form shown in FIG. 2, the following information will be created and stored in the development repository 19, and is to be used in the SCL generation process. The user would indicate the data entry fields and the static text in the Form.

| SCL | SCL OFFSETS | | |
|---|---|---|---|
| DATANAMES | Row | Column | Length |
| EMPSSN | 3 | 19 | 20 |
| LASTNAME | 4 | 19 | 25 |
| CREATOR | 5 | 19 | 10 |
| . | | | |
| . | | | |

The user/creator has a great deal of flexibility and can create a push button or a window for a specific field, can change names or use previous text, etc. The output is stored in the development repository 19.

Referring now to FIG. 3, a print illustrates a computer screen display of a modernized version of the 3GL form shown in FIG. 2 and described hereinabove. Notice that this modernized Form includes windows for entering data, wherein window 20 corresponds to the space 20 in FIG. 2 for entry of an Employee SSN. Window 24 corresponds to the space 24 in FIG. 2. A TRANSMIT button 28 is added by the modernizing process.

Referring now to FIG. 4, the modernized Form shown in FIG. 3 is now embedded within a Web browser display, having been stored in the repository 18 and retrieved by a Web browser at client 15 using the method of this invention. Corresponding reference numbers identify like components.

Figure 5A:
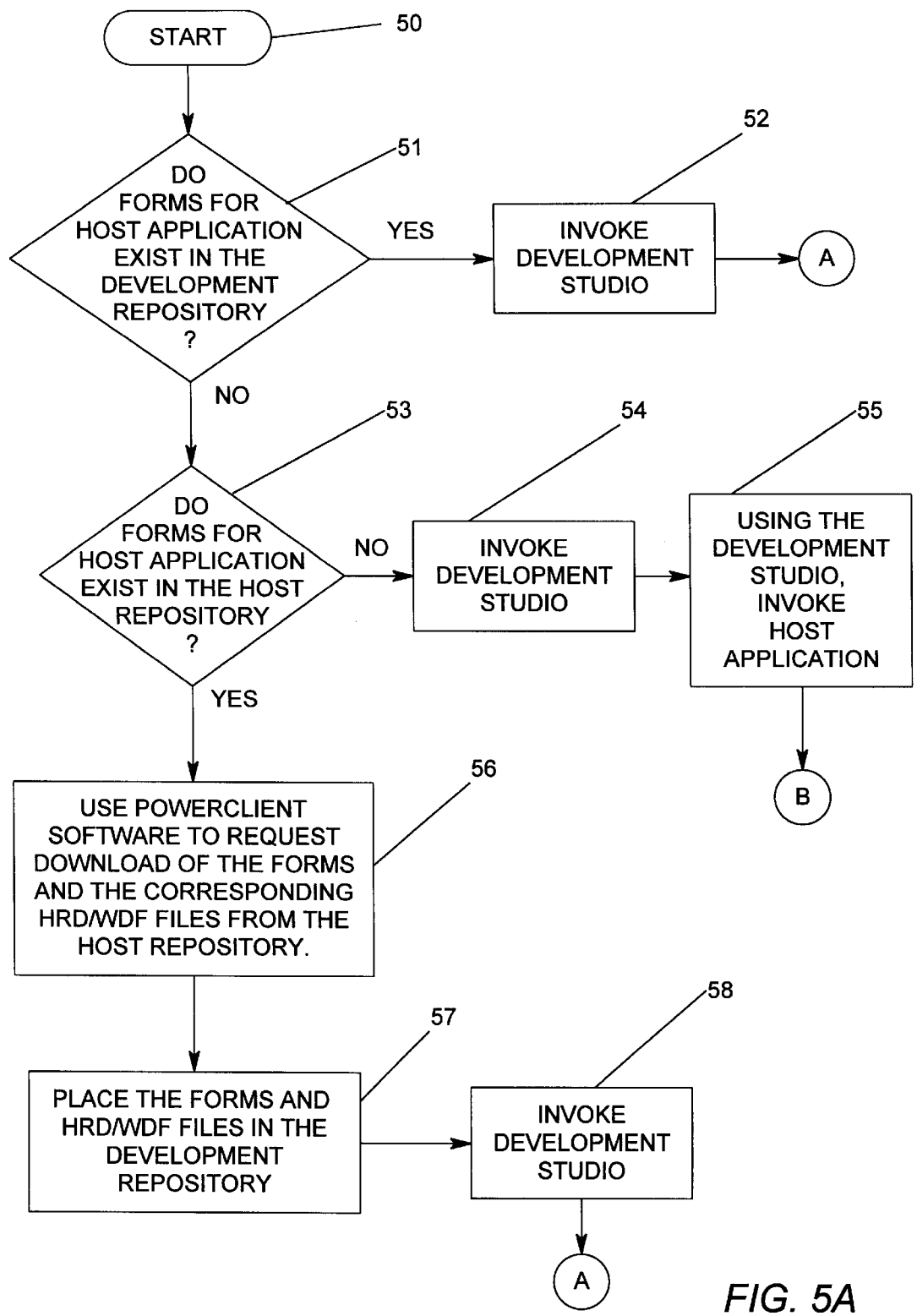
FIGS. 5A through 5C combined Form a flow chart illustrating the process for development of files for use with the method of the present invention.

Referring now to FIG. 5A, which is the first of a three-sheet drawing showing a flow chart of the process for development of files for use with the method of the present invention. The process begins in the client 16 with a start bubble 50 followed by an inquiry as to whether or not Forms for the host application exist in the development repository 19 (diamond 51). If the answer to this inquiry is yes, then the Development Studio is invoked (block 52). On the other hand, if the Forms do not exist in the development repository, another inquiry is made as to whether or not Forms for the host application exist in the host repository 17 (diamond 53). If the Forms do not exist on the host, then the Development Studio is invoked (block 54) and with the use of the Development Studio, the host application is invoked (block 55).

If the host application Form does exist in the host repository 17 (yes leg of the diamond 53), then the PowerClient software is used to request a download of the Forms and the corresponding HRD/WDF files from the host repository 17 (block 56). Next, the Forms and the HRD/WDF files are placed in the development repository 19 (block 57). After this, the Development Studio is invoked (block 58). Upon completion of the step 52 or the step 58 a branch is made to a later point in the process at a connector A, which will be described shortly. Upon completion of the step 55 a branch is taken to FIG. 5B at a connector B.

Figure 5B:
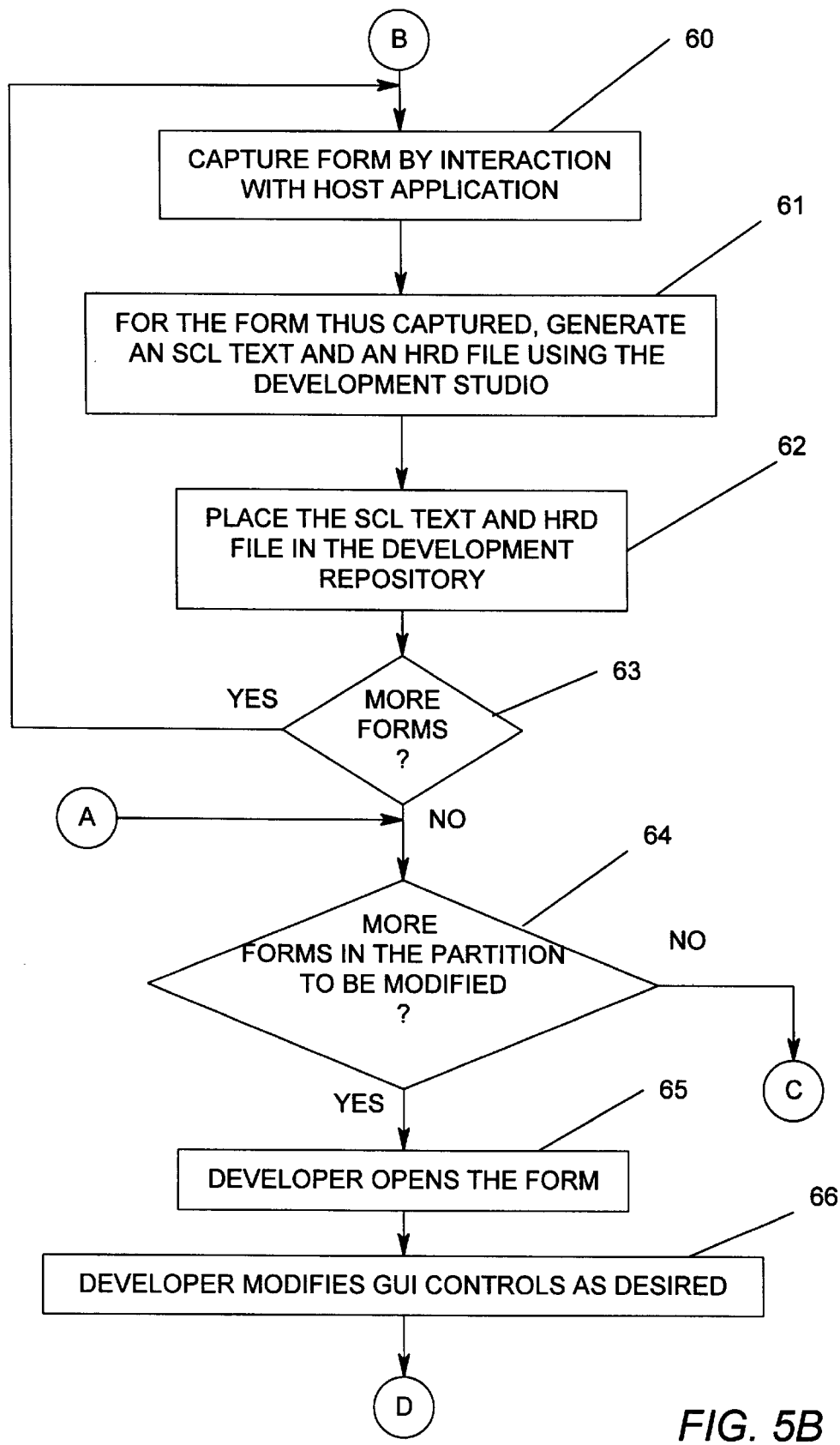

Referring now to FIG. 5B at the connector B, the next step in the development process is to capture a Form by interaction with the host application (block 60). For the Form thus captured, an SCL Text and an HRD file are generated using the Development Studio (block 61). Following this, the SCL Text and the HRD file are placed in the development repository 19 (block 62). An inquiry is then made as to whether or not there are more Forms (diamond 63). If the answer is yes, then a return is made back to the process block 60. This cycle repeats itself until all Forms have been processed, and an exit is taken on the no leg of the diamond 63.

The process of updating and modifying of the Forms begins when an inquiry is made as to whether or not there are more Forms in the Partition to be modified (diamond 64). Note that the connector A from the preceding FIG. 5A is also an input to the diamond 64. If the answer to the diamond 64 inquiry is yes, then the developer or user opens the Form by using the Development Studio (block 65). On the other hand, if there are no more Forms in the Partition to be modified, then a branch is made to a later point in the process as illustrated by a connector C. Next, the developer modifies the GUI Controls as desired (block 66). Following this, the process illustration continues on the next sheet of the drawings, FIG. 5C in particular, as illustrated by a connector D.

Figure 5C:
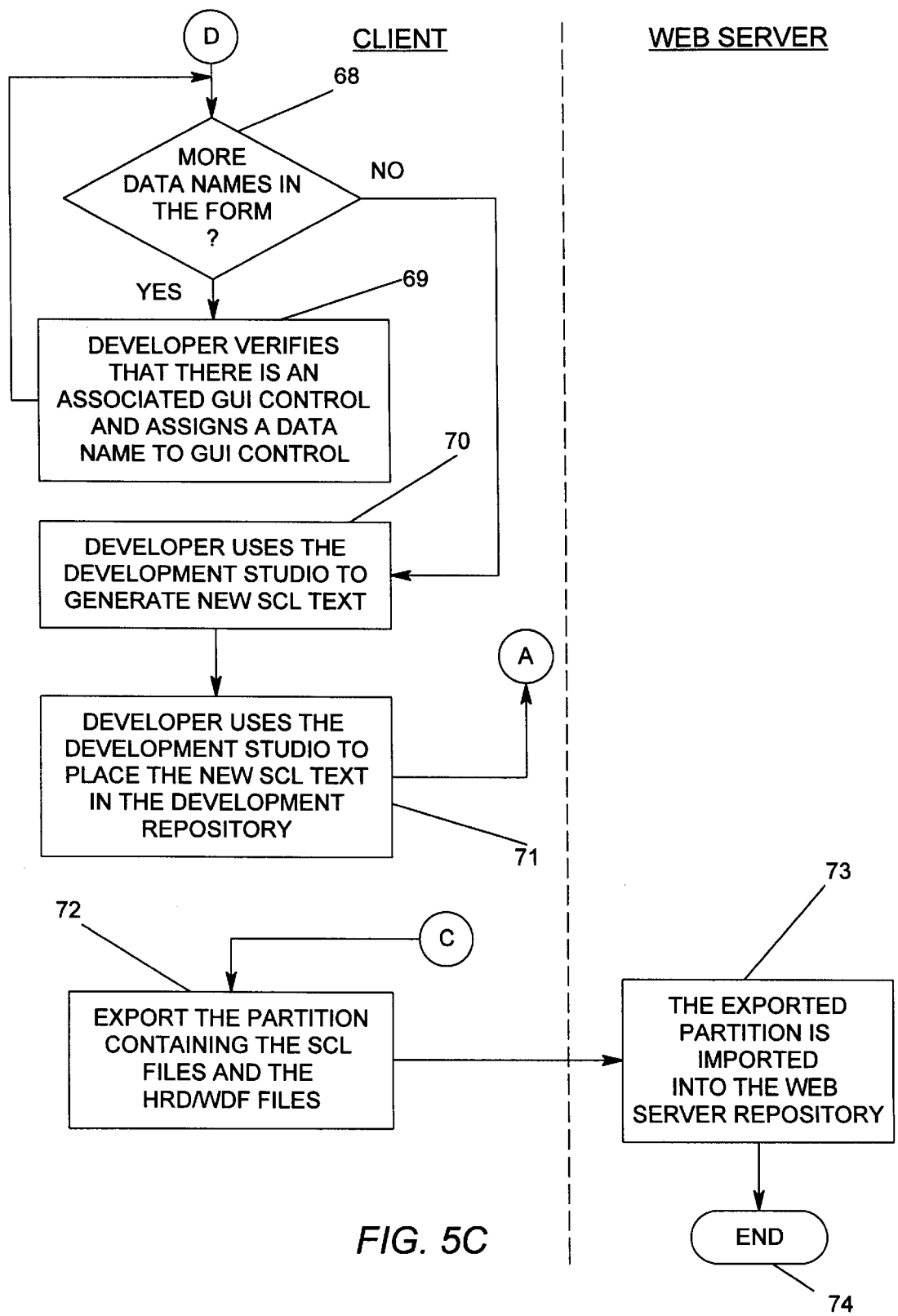

Referring now to FIG. 5C at the connector D, an inquiry is made as to whether or not there are more Data Names in the Form (diamond 68). If the answer to this inquiry is yes, then the developer verifies that there is an associated GUI Control and assigns a Data Name to the GUI Control (block 69). Once all of the Data Names in the process have been verified, then an exit is taken from the no leg of the diamond 68 to another step in which the developer uses the Development Studio to generate a new SCL Text (block 70). Following this, the developer uses the Development Studio to place the new SCL Text in the development repository 19 (block 71). On completion of this step, a return is made back to that part of the process illustrated in FIG. 5B at the connector A, and in particular to the inquiry in the diamond 64. Once all of the Forms in the Partition have been modified, then an exit is taken from the no leg of the diamond 64 at the connector C and continues in FIG. 5C, whereupon the Partition containing the SCL Files and the HRD/WDF files is exported from the Development Repository 19 (block 72). The exported Partition is imported into the Web Server repository 18 (block 73) and the process ends (bubble 74).

At this juncture the SCL Text for the Forms in the last application have been developed in accordance with the directions of the developer/user.

Figure 6A:
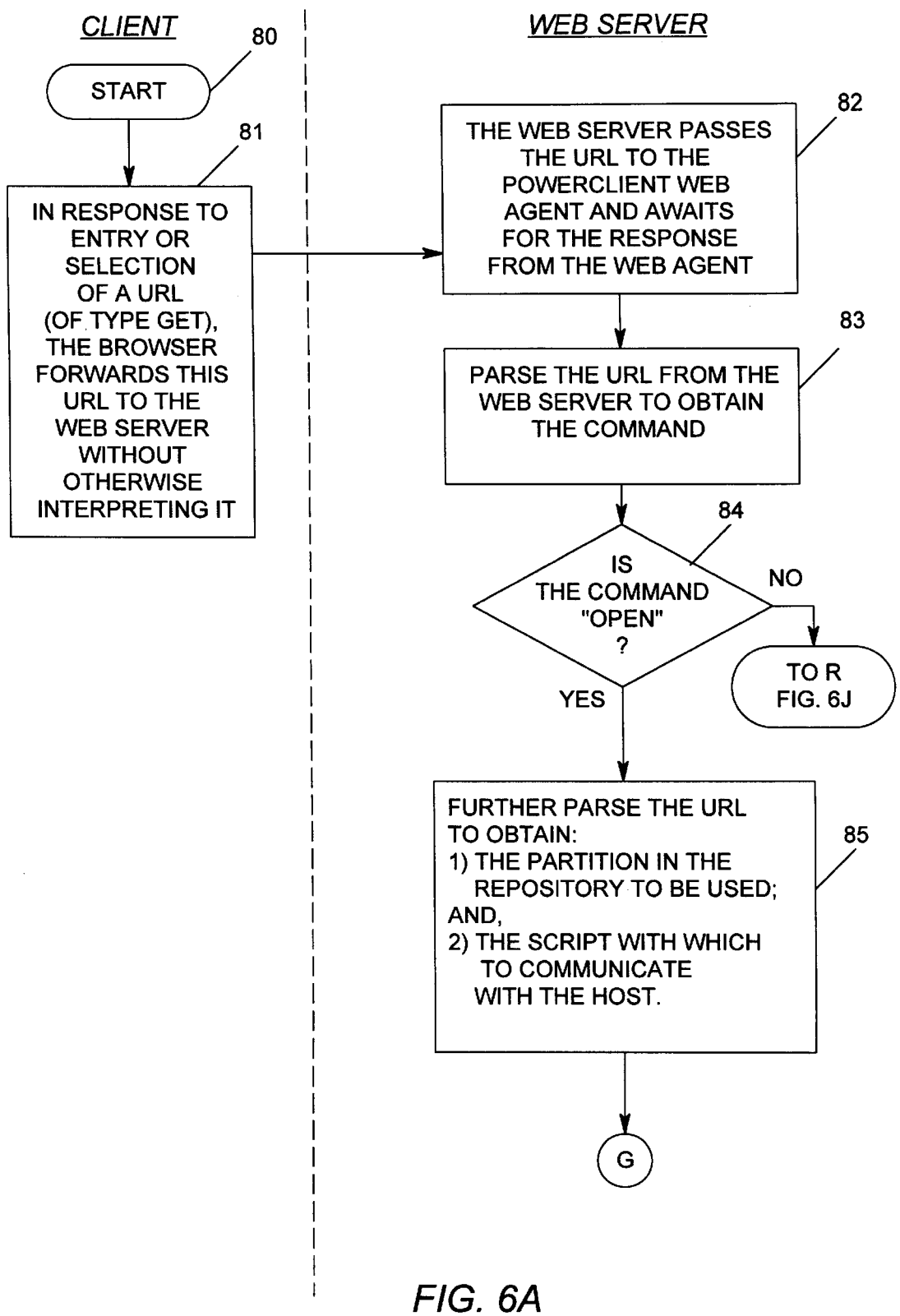

Referring now to FIG. 6A, the first of a ten-sheet drawing is shown that illustrates the run-time process, which includes the steps of the present invention. The process begins in the client 15 with a start bubble 80 followed by a process step performed in response to entry or selection of an URL that contains certain elements, among which are an open Command, a Form name, a Script name and a Partition name. A Web browser forwards the URL to the Web server 14 without otherwise interpreting it (block 81). Next, within the Web Server 14, the URL is passed to the Web Agent (to which it is addressed) and awaits for a response from the Web Agent (block 82).

The Web Agent then parses the URL from the Web Server 14 to obtain the Command which is embedded within it (block 83). Next, an inquiry is made as to whether or not the Command is "Open" (diamond 84). If the answer to this inquiry is no, then a branch is taken to a later point in the process as depicted by a connector R. On the other hand, if the answer to this inquiry is yes, then the Web Agent further parses the URL (block 85) to obtain the following:

1.) the Partition in the repository 18 to be used; and,
2.) the Script for communicating with the host.

Figure 6B:
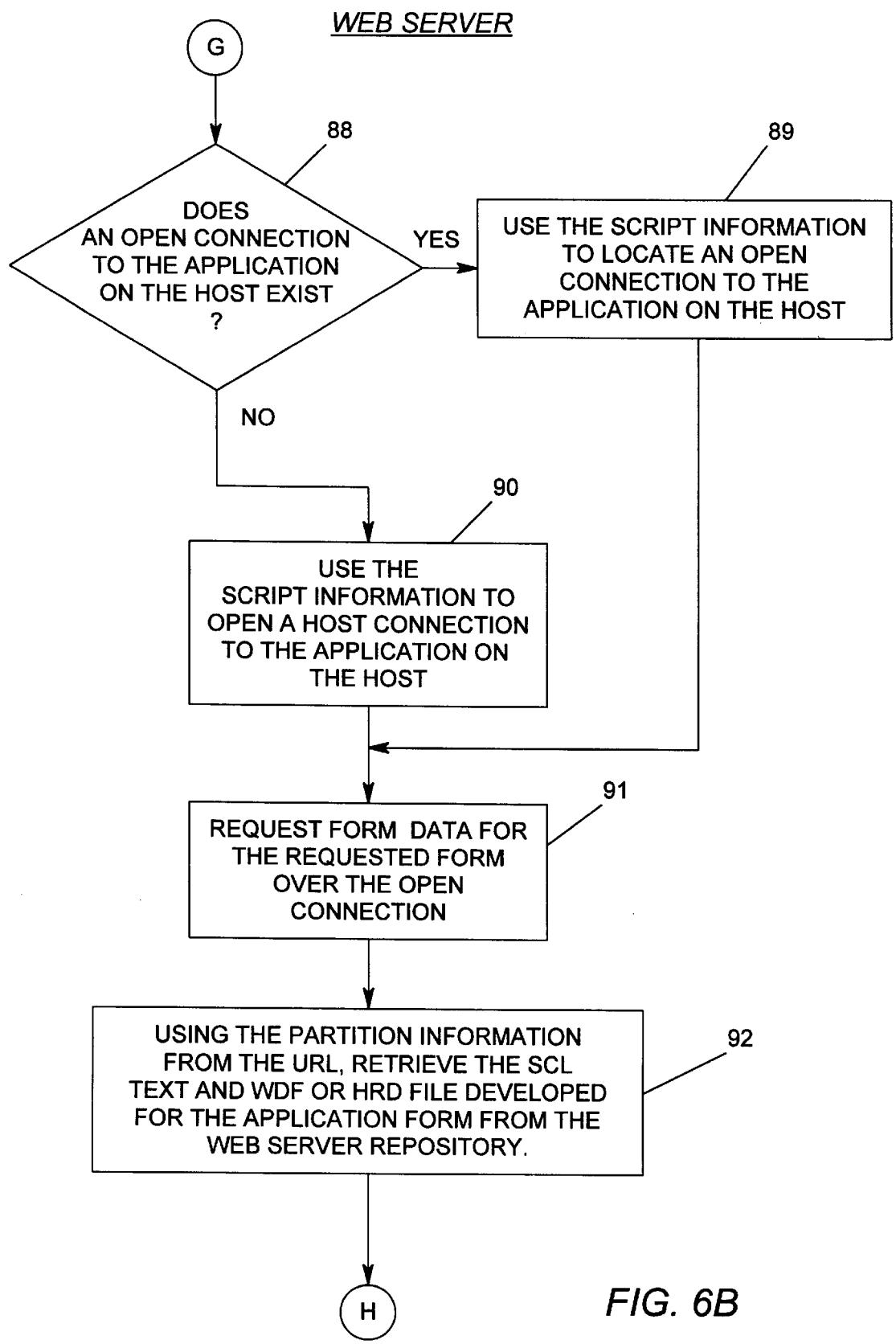

The process illustration continues in FIG. 6B at a connector G.

Referring now to FIG. 6B at the connector G, an inquiry is made as to whether or not an open connection to the application on the host 10 exists (diamond 88). If the answer to this inquiry is yes, then the Web Agent uses the Script information to locate an open connection to the application on the host 10 (block 89) On the other hand, if the answer to this inquiry is no, then the Web Agent uses the Script information to open a connection to the host 10 (block 90). After completion of either the step 89 or 90, the Web Agent requests Form data for the requested Form over the open connection (block 91). After this, and using the Partition information from the URL, the Web Agent retrieves the SCL Text and the WDF or HRD file developed for the application Form from its repository 18 (block 92). The process illustration continues on the next sheet of the drawings as denoted by a connector H.

Figure 6C:
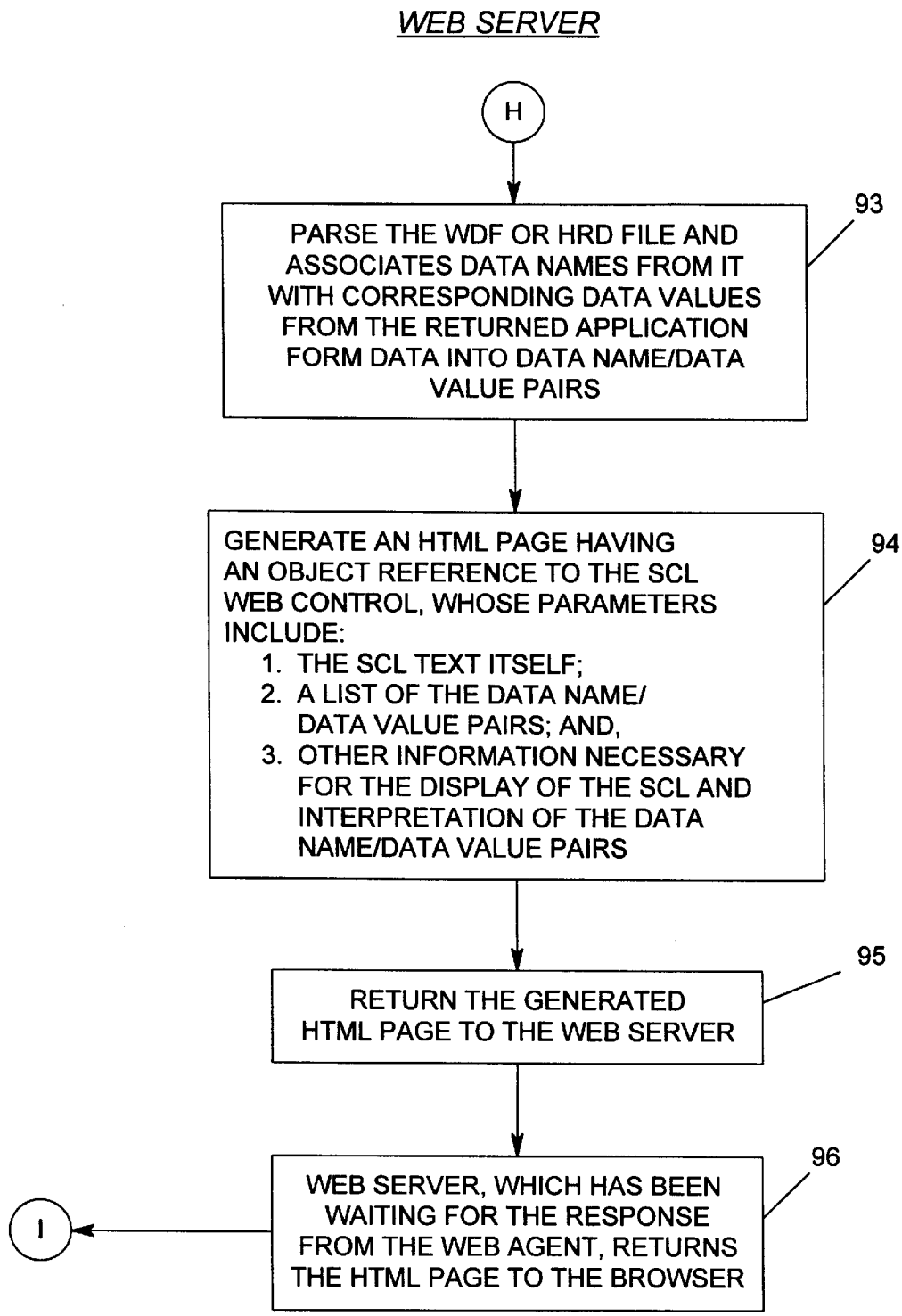

Referring now to FIG. 6C at the connector H, the Web Agent parses the WDF or HRD file and associates Data Names from it with corresponding Data Values from the returned application Form data into Data Name/Data Value pairs (block 93). Next, the Web Agent generates an HTML page having an object reference to the SCL Web Control, whose parameters include:

1.) The SCL Text itself;
2.) A list of the Data Name/Data Value pairs; and,
3.) Other information necessary for the display of the SCL and interpretation of the Data Name/Data Value pairs (block 94).

The Web Agent then returns the generated HTML page to the Web server (block 95). Following this, the Web server, which has been waiting for the response from the Web Agent, returns the HTML page to the Web browser (block 96). The process illustration continues in the next sheet of the drawings within the PC 15, as denoted by a connector I.

Figure 6D:
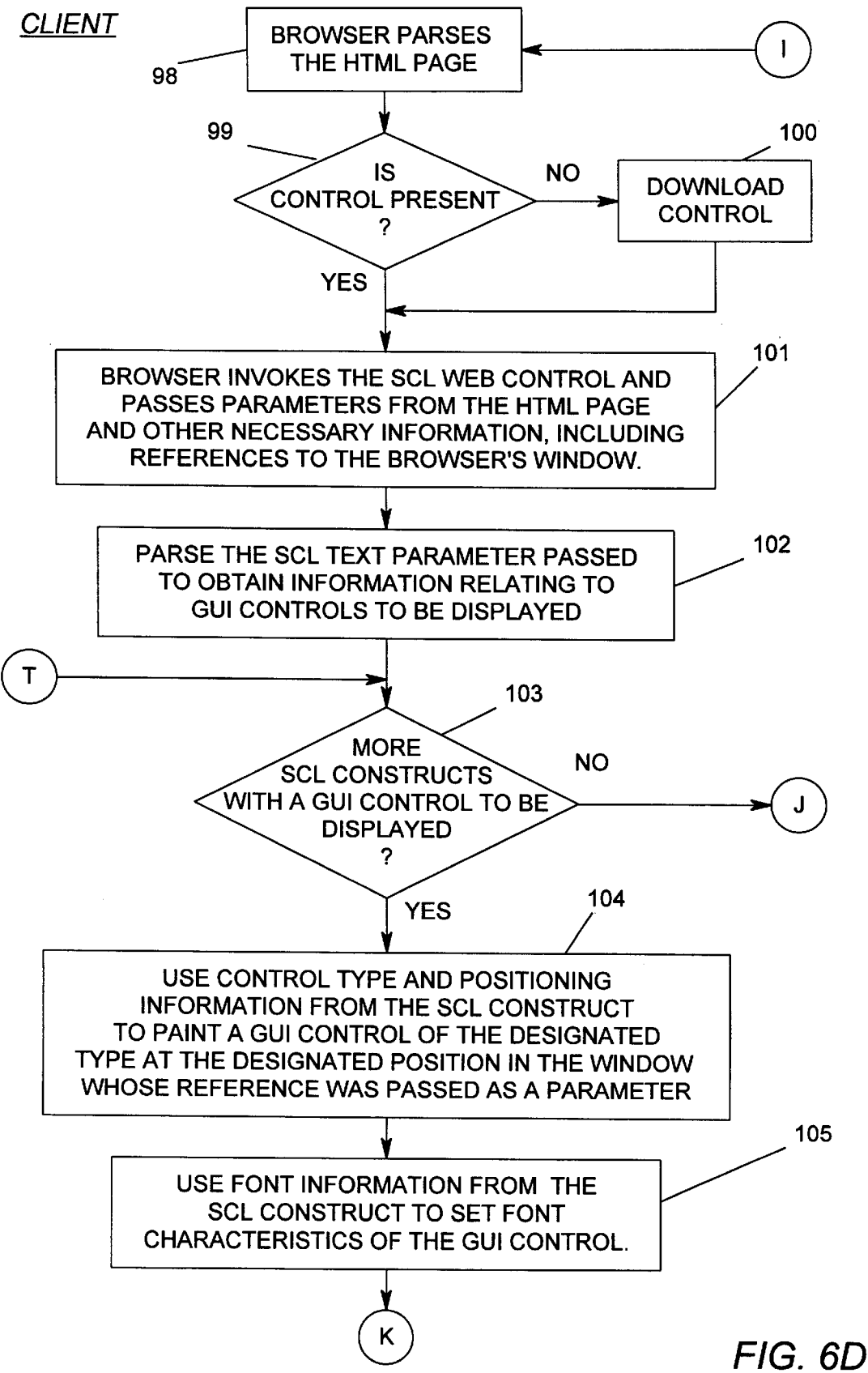

Referring now to FIG. 6D at the connector I, the Web browser parses the HTML page (block 98). Upon encountering the object reference to the SCL Web Control, an inquiry is made as to whether or not the SCL Web Control is present (diamond 99). If the answer is no, then SCL Web Control is downloaded (block 100). Once the SCL Web Control is present, the browser invokes the SCL Web Control and passes to it the parameters from the HTML page and other necessary information, including references to the Web browser's window (block 101). Following this, the SCL Web Control parses the SCL Text parameter passed to it to obtain information relating to the GUI Controls to be displayed (block 102).

An inquiry is next made as to whether or not there are more SCL Constructs with a GUI Control to be displayed (diamond 103). If the answer to this inquiry is no, then a branch is made to a later part of the process, which will be described later, as designated by a connector J. On the other hand, if the answer to this inquiry is yes, then the SCL Web Control uses the control type and positioning information from the SCL Construct to paint a GUI Control of the designated type at the designated position in the window whose reference was passed to it as a parameter (block 104). Next, the SCL Web Control uses font information from the SCL Construct to set font characteristics of the GUI Control (block 105). The process illustration continues in the next sheet of the drawings as denoted by a connector K.

Figure 6E:
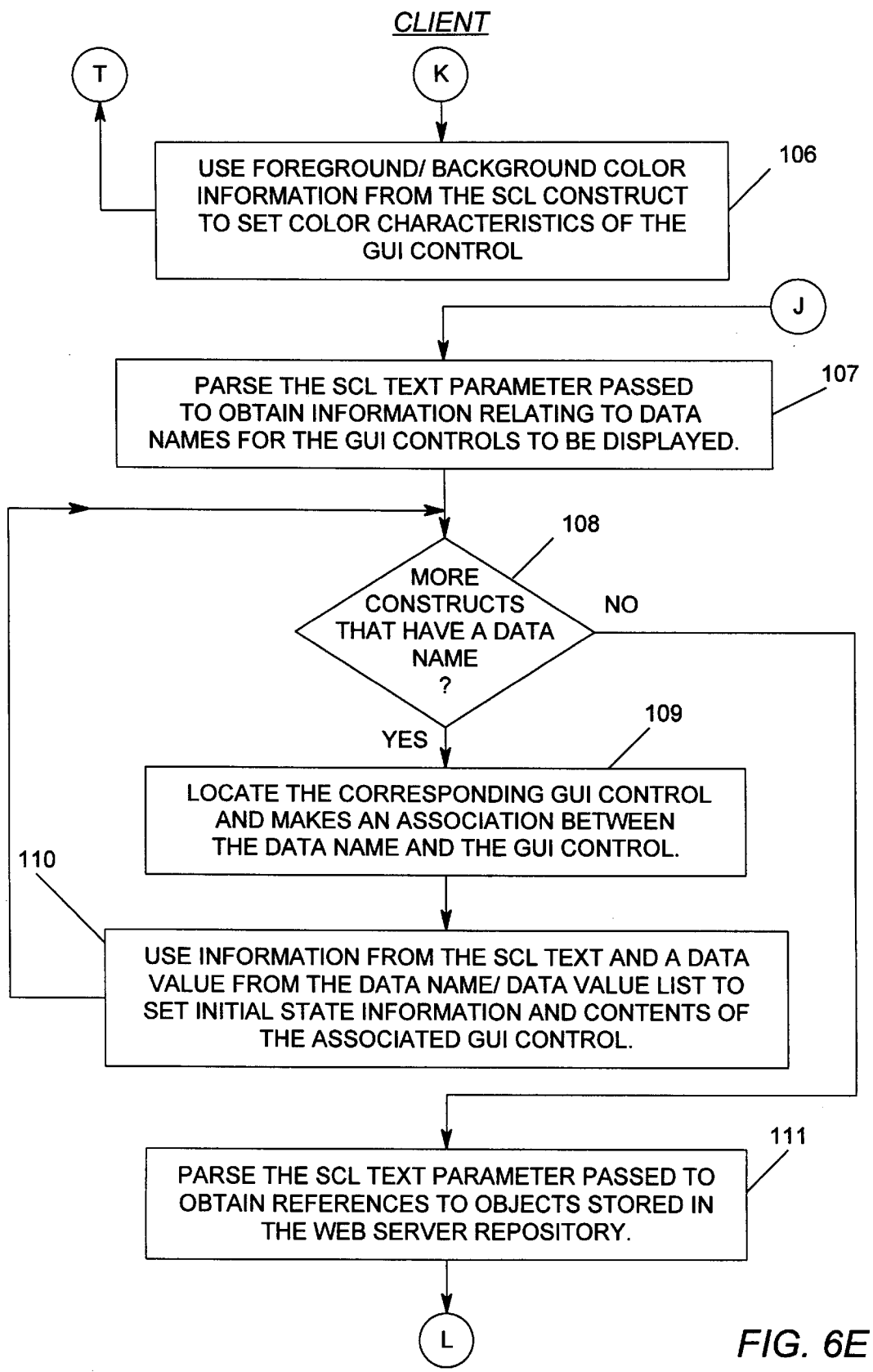

Referring now to FIG. 6E at the connector K, the SCL Web Control uses foreground/background color information from the SCL Construct to set color characteristics of the GUI Control (block 106). Following this step, a return is made back to the diamond 103 (via a connector T to FIG. 6D) for processing the next SCL Construct. Once all of the SCL Constructs have been processed, a branch is taken via the connector J to a process step wherein the SCL Web Control parses the SCL Text parameter passed to it to obtain information relating to Data Names for the GUI Controls to be displayed (block 107). Following this, an inquiry is made as to whether or not there are more constructs that have a Data Name (diamond 108). If the answer to this inquiry is yes, then the SCL Web Control locates the corresponding GUI Control and makes an association between the Data Name and the GUI Control (block 109).

The SCL Web Control then uses information from the SCL Text and a Data Value from the Data Name/Data Value list to set initial state information and contents of the associated GUI Control (block 110). Next a return is made back to the diamond 108 for processing the next construct. Once all of the constructs have been processed, a branch is taken to a process step wherein the SCL Web Control parses the SCL Text parameter passed to it to obtain references to objects stored in the Web Agent repository 18 (block 111). The process illustration continues on the next sheet of the drawings as denoted by a connector L.

Figure 6F:
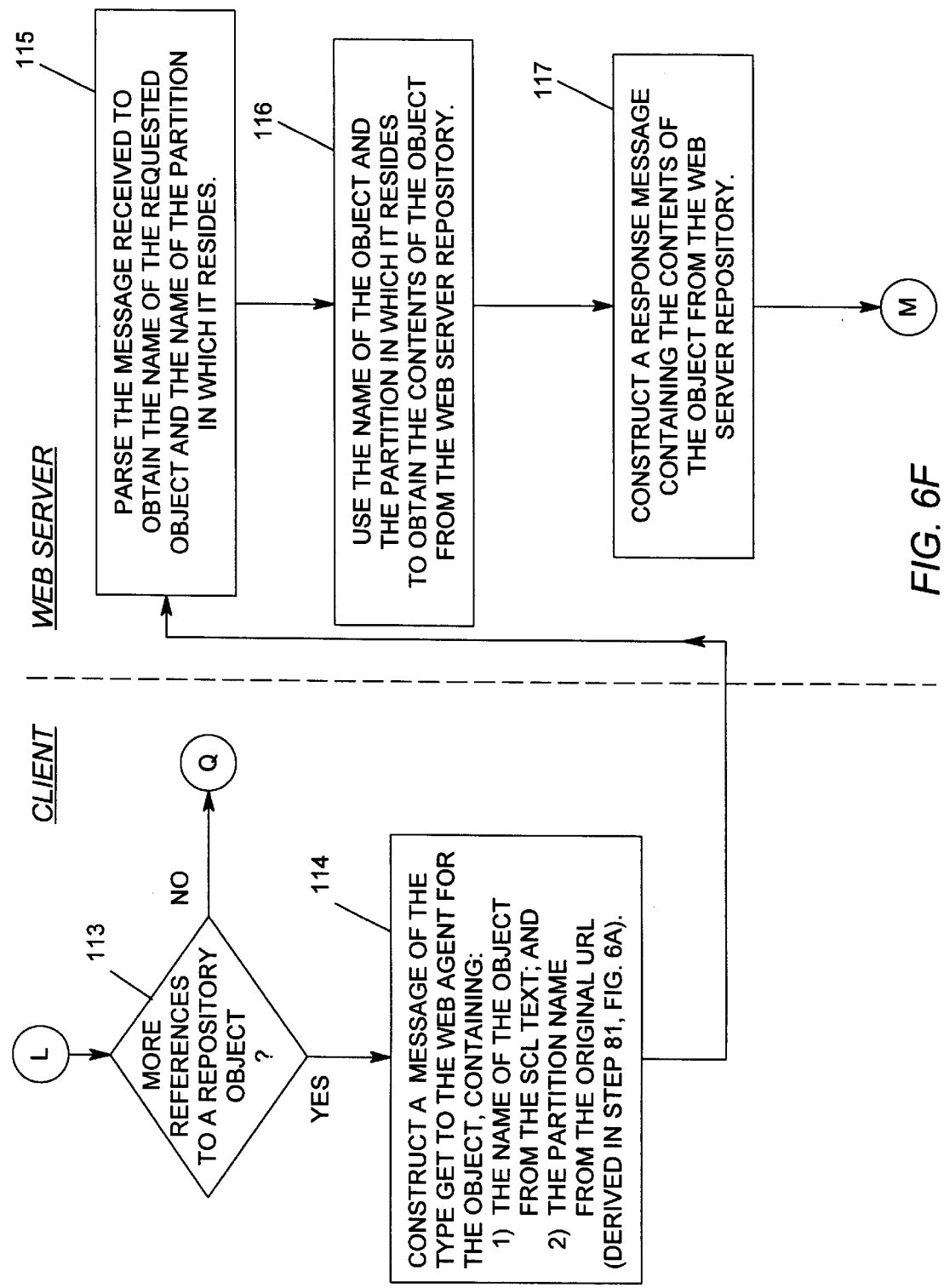

Referring now to FIG. 6F at the connector L, an inquiry is made as to whether or not there are more references to a Repository Object (diamond 113). If the answer to this inquiry is no, then a branch is made to a later-described part of the process as denoted by a connector Q. On the other hand, if the answer to the inquiry is yes, then the SCL Web Control constructs a message to the Web Agent for the object containing:

1.) The name of the object from the SCL Text; and,
2.) The Partition name from the original URL, which was derived in step 81, FIG. 6A.

Within the Web server 14, the Web Agent parses the message received to obtain the name of the requested object and the name of the Partition in which it resides (block 115). Next, the Web Agent uses the name of the object and the Partition in which it resides to obtain the contents of the object from the Web Server repository 18 (block 116). After this, the Web Agent constructs a response message containing the contents of the object from the Web Server repository 18 (block 117). The process illustration continues in the next sheet of the drawings as denoted by a connector M.

Figure 6G:
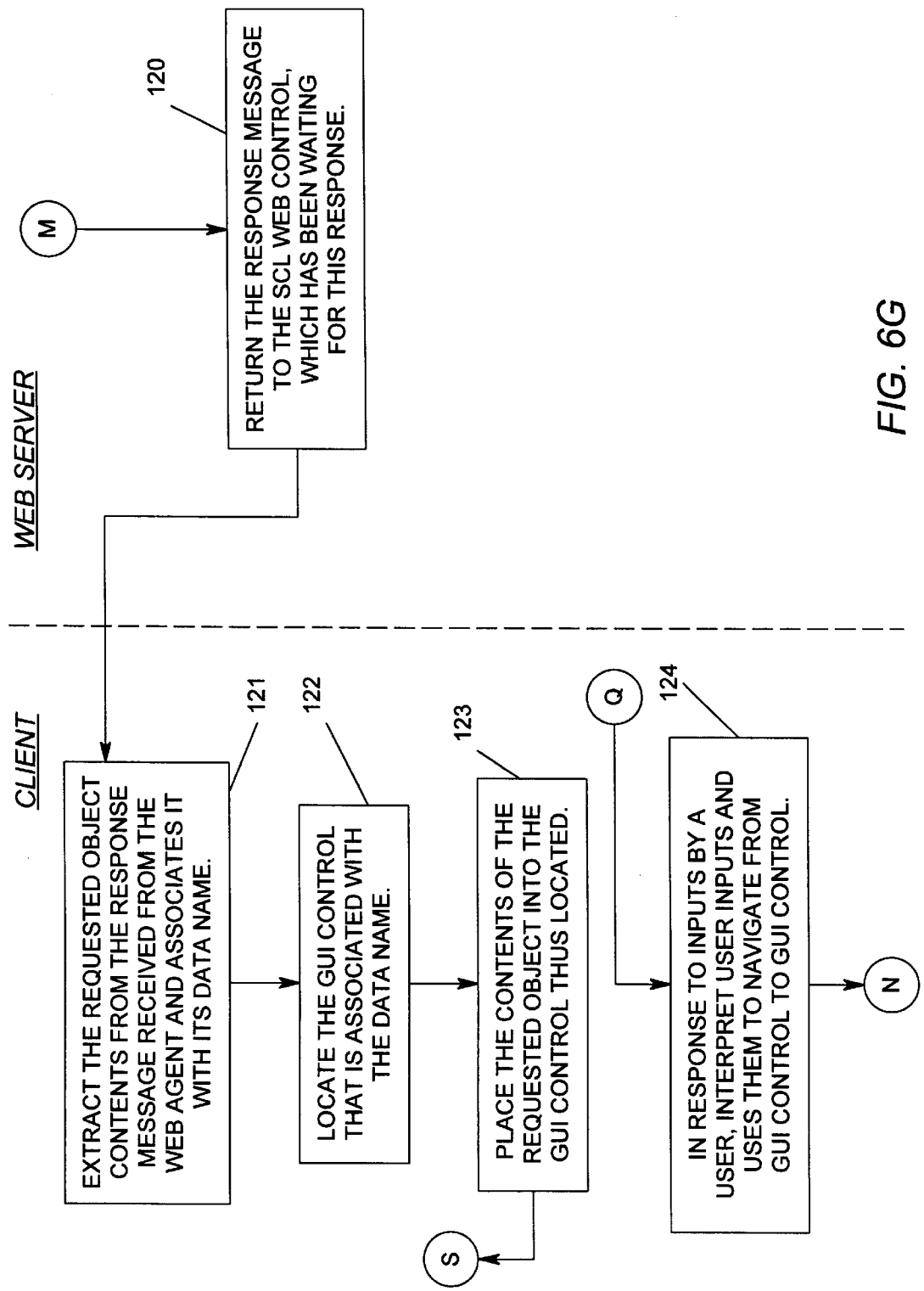

Referring now to FIG. 6G at the connector M, the Web Agent returns the response message to the SCL Web Control, which has been waiting for this response (block 120). Within the client 15, the SCL Web Control extracts the requested object contents from the response message received from the Web Agent and associates it with its Data Name (block 121). Next, the SCL Web Control locates the GUI Control that is associated with the Data Name (block 122). The SCL Web Control then places the contents of the requested object into the GUI Control thus located (block 123). At this juncture of the process a return is made back to the diamond 113 in FIG. 6F, as denoted by a connector L, to process the next reference to a Repository Object.

The connector Q from the no leg of the diamond 113 (FIG. 6F) intercepts the process at this point. In response to inputs by a user of the client 15, the Web control interprets user inputs and uses them to navigate from one GUI Control to another (block 124). The process illustration continues on the next sheet of the drawings as denoted by a connector N.

Figure 6H:
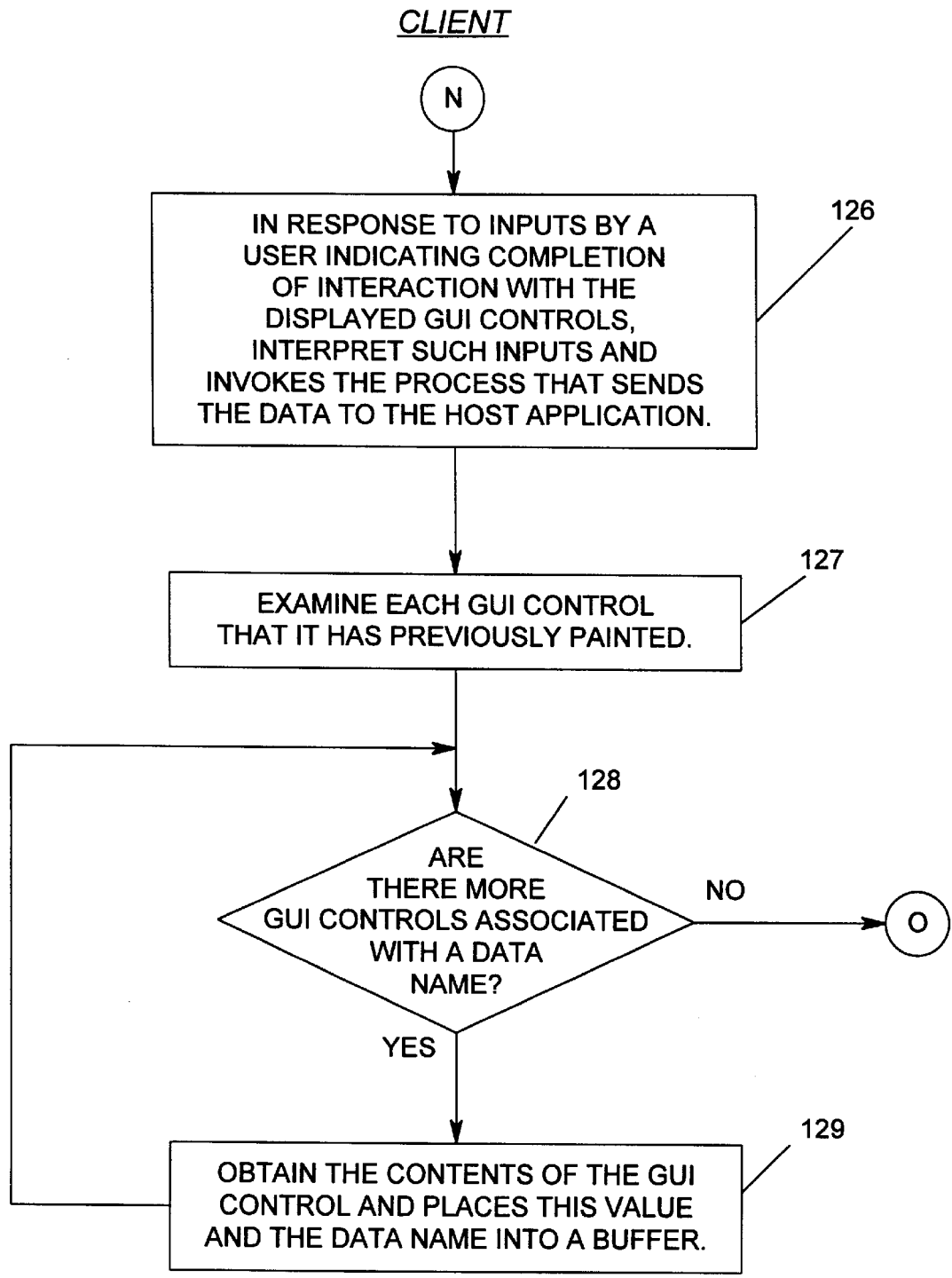

Referring now to FIG. 6H at the connector N, in response to inputs by a user of the client 15 indicating completion of interaction with the displayed GUI Controls, the Web control interprets such inputs and invokes the process that sends the data to the host application (block 126). This process begins at a process step where the SCL Web Control examines each GUI Control that it has previously painted (block 127). Following this, an inquiry is made as to whether or not there are more GUI Controls associated with a Data Name (diamond 128). If the answer to this inquiry is no, then a branch is made to a later point in the process as denoted by a connector 0. On the other hand, if the answer to this inquiry is yes, then the SCL Web Control obtains the contents of the GUI Control and places this value and the Data Name into a buffer (block 129). Upon completion of this step a return is made back to the diamond 128 to inquire again if there are more GUI Controls associated with a Data Name. When all GUI Controls have been completed, an exit is taken to the next sheet of the drawings as denoted by the connector 0.

Figure 6J:
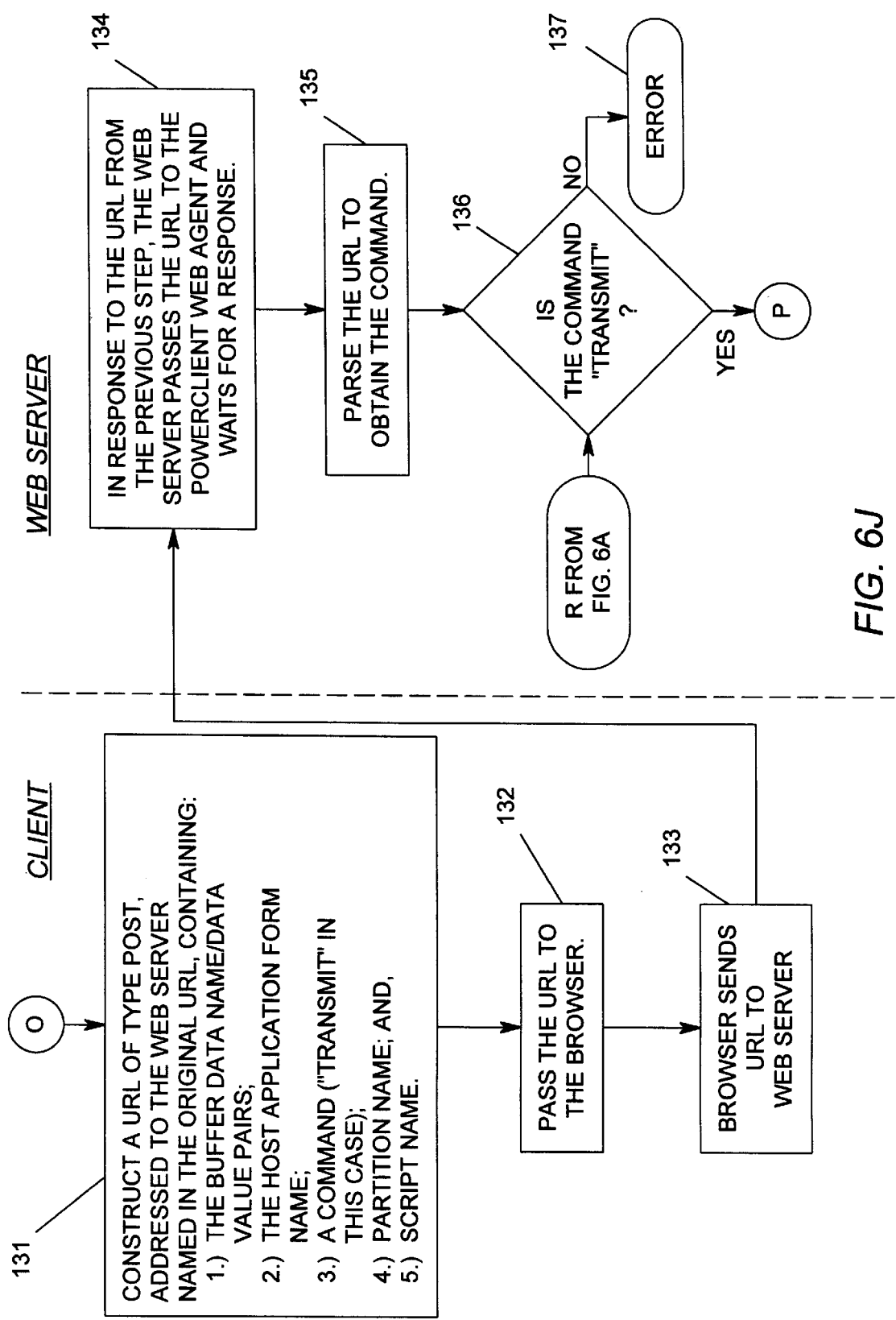

Referring now to FIG. 6J at the connector 0, and still within the client 15, the SCL Web Control constructs a URL of type POST, addressed to the web server named in the original URL (derived at step 81, FIG. 6A), containing:

1.) The buffer Data Name/Data Value pairs;
2.) The host application Form name;
3.) A Command ("Transmit" in this case);
4.) Partition name; and,
5.) Script name (block 131).

The SCL Web Control then passes the URL to the Web browser (block 132). Next, the Web browser sends the URL to the Web server 14 (block 133). Within the Web server and in response to the URL from the previous step, the web server passes the URL to the PowerClient Web Agent (to which it is addressed) and waits for a response (block 134). Next, the Web Agent parses the URL to obtain the Command (block 135). After this, an inquiry is made as to whether or not the Command is "Transmit" (diamond 136). If the answer to this inquiry is no then an error message is issued (bubble 137). Note that the connector R, which is from the diamond 84 (FIG. 6A) and an indication that the Command is not "Open", is another input to the diamond 136. The error message is issued since the Command is neither an "Open" nor a "Transmit", which are the only two choices. On the other hand if the answer to this inquiry is yes, then the process continues on to the next sheet of the drawings as depicted by a connector P.

Figure 6K:
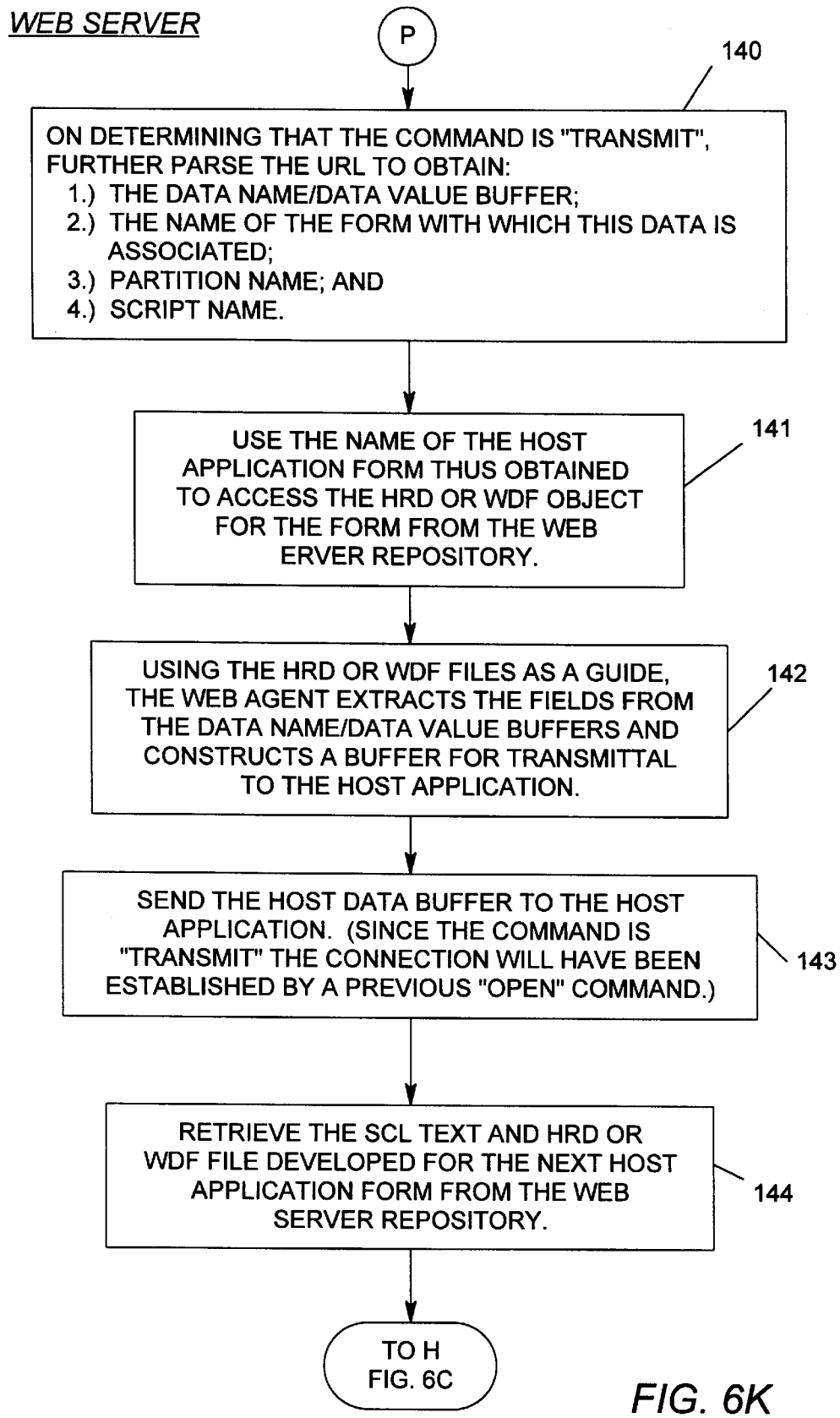

Referring now to FIG. 6K at the connector P, on determining that the Command is "Transmit", the Web Agent further parses the URL to obtain:

1.) The Data Name/Data Value buffer;
2.) The name of the Form with which this data is associated;
3.) Partition name; and,
4.) Script name (block 140).

The Web Agent then uses the name of the host application Form thus obtained to access the HRD or WDF object for the Form from the Web Agent repository 18 (block 141). Next, using the HRD or WDF files as a guide, the Web Agent extracts the fields from the Data Name/Data Value buffers and constructs a buffer for transmittal to the host application in the host 10 (block 142). After this, the Web Agent sends the host data buffer to the host application using the Script name obtained in step 140. Since the Command is "Transmit" the connection will have been established by a previous "Open" Command (block 143). It waits for a response from the host 10, which response includes the name of the next host application Form. Finally, the Web Agent retrieves the SCL Text and the HRD or WDF file developed for the next host application Form from the repository 18. After completion of this step the process repeats itself by returning to the process step 93 (FIG. 6C) as denoted by the connector H.

The method of the present invention is useful in a computing system having at least one server and a multiplicity of clients coupled thereto by means of a network. The server includes a CPU executing a Web Server program and has a repository coupled thereto for storing description language of a Form to be displayed. The Web server is coupled to a host having a CPU executing a legacy application containing the Form, all of which is illustrated in FIG. 1 and described hereinabove. At least one of the clients executes a Web browser program. The method of the present invention operates in the server and the client for supporting enterprise application data binding. As described hereinabove, the program running in the client is referred to as the SCL Control and the program running in the Web server is referred to as the Web Agent.

Figure 7:
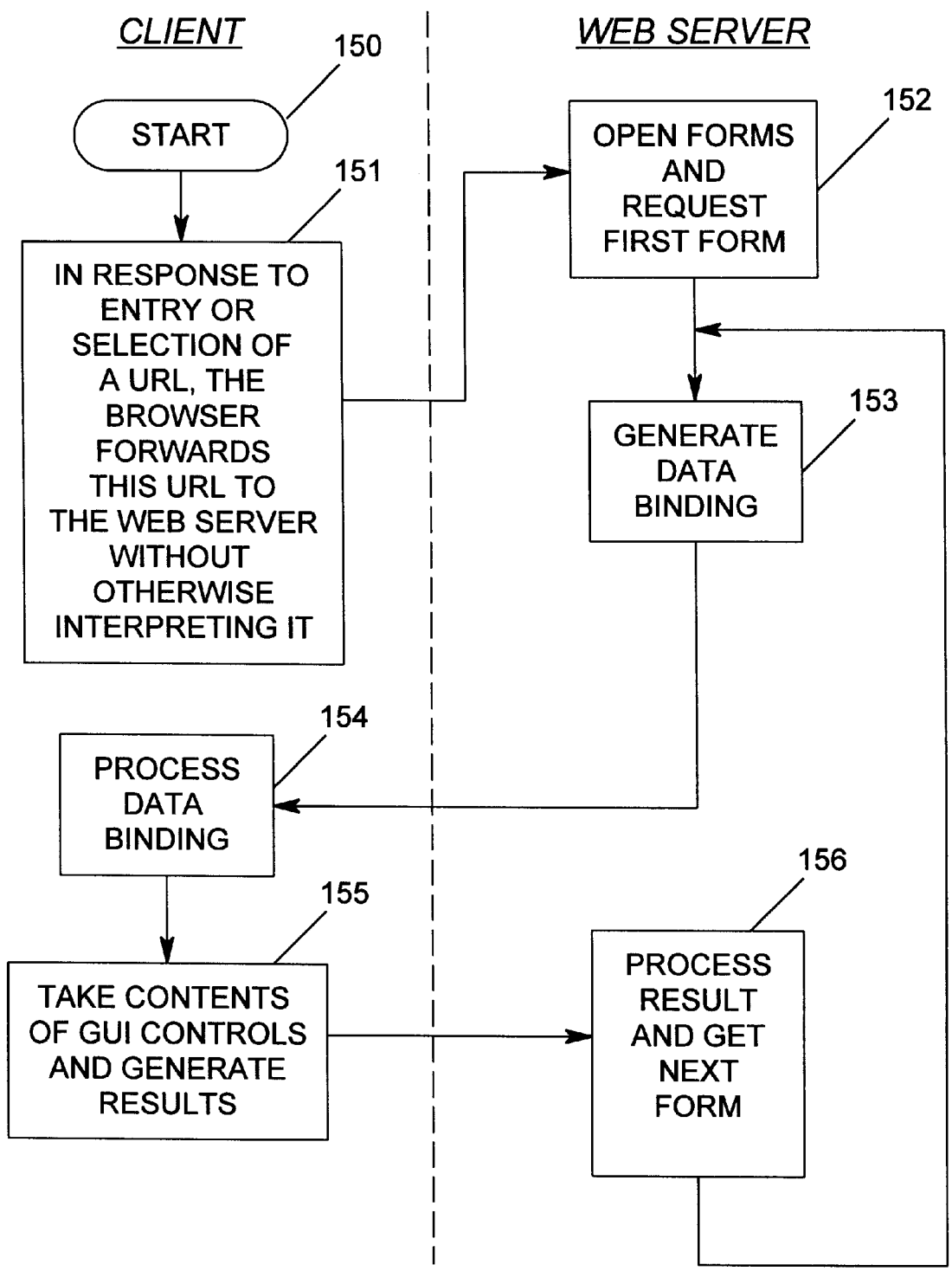
FIG. 7 is a diagram of the process of the present invention.

Referring now to FIG. 7, a summary of the method of this invention is illustrated. The process begins with a start bubble 150 followed by a step of the browser forwarding an URL entered by a user to the Web Agent without otherwise interpreting it (block 151). The Web Agent opens the Forms and requests a first Form (block 152). Next, data binding is generated by associating data names with data values received from the host, which is sent to the client (block 153). The SCL Control program then processes the data binding by locating corresponding GUI Controls and making an association between each of the data names and corresponding GUI Controls (block 154). Following user interaction with the displayed GUI Controls, the SCL Control program obtains the contents of each of the corresponding GUI Controls associated with a data name and places a data value/data name pair into a buffer (block 155). These results are passed to the server where the Web Agent processes the contents of the buffer and sends it to the host (block 156). The server then retrieves a next Form from the host. Accordingly, from the foregoing the GUI Controls are displayed containing values and states from the Form.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computing system having at least one server and a multiplicity of clients coupled thereto by means of a network, said server having a CPU executing a Web Server program and having a repository coupled thereto for storing description language of a Form to be displayed, at least one of said clients executing a Web browser program, a method operating in said server and said at least one of said clients (hereafter said client) for supporting enterprise application data binding, said method comprising the steps of:
   a. in said server opening said Forms and requesting a first Form;
   b. in said server generating data binding of data names with data values and sending to said client;
   c. in said client processing said data binding with GUI Controls and sending to said server;
   d. in said server taking contents of GUI Controls and generating results;
   e. in said server processing said results and getting next Form from said Forms;
   whereby said GUI Controls are displayed containing values and states from said Form.

2. The method as in claim 1 wherein step d thereof further includes for each GUI Control associated with a data name, obtaining contents of said GUI Control and placing value thereof and data name into a result buffer.

3. The method as in claim 2 further including the step of constructing a response URL containing said result buffer and a command.

4. The method as in claim 3 further including the step of passing said response URL to said Web browser.

5. The method as in claim 1 wherein step e thereof further includes the step of parsing said results to determine said command.

6. The method as in claim 5 further including the step of, in response to said command, accessing said file developed for said legacy application Form and, using information from said file as a template, extracting values from said result buffer to construct a legacy application buffer for transmittal to said host.

7. The method as in claim 5 further including the step of transmitting said legacy application buffer to said legacy application at said host and, in response to a next Form invocation from said legacy application, retrieving from said repository Form description language text and files developed for said next Form.

8. In a computing system having at least one server (hereafter "said server") and a multiplicity of clients coupled thereto by means of a network, said server having a CPU executing a Web Server program and having a repository coupled thereto for storing description language of a Form to be displayed, a host having a CPU executing a legacy application containing said Form, and at least one of said clients (hereafter said client) executing a Web browser program, a method operating in said server and said client for supporting enterprise application data binding, said method comprising the steps of:
   a. in said server opening said Forms and requesting a first Form from said host;
   b. in said server generating data binding by associating data names with data values received from said host and sending to said client;
   c. in said client processing data binding by locating corresponding GUI Controls and making an association between each of said data names and said corresponding GUI Control;
   d. in said client obtaining contents of each of said corresponding GUI Controls associated with a data name and placing value and data name into a buffer;
   e. in said server processing contents of said buffer and sending to said host
   f. in said server retrieving a next Form from said host;
   whereby said GUI Controls are displayed containing values and states from said Form.

9. The method as in claim 8 wherein step a thereof includes receiving an URL from said Web browser and parsing said URL to obtain a command.

10. The method as in claim 9 further including in response to said command, further parsing of said URL to obtain partition in said repository and script for communicating with said host.

11. The method as in claim 10 further including the step of retrieving from said repository Form definition language text and a file developed for said Form for the purpose of mapping elements of a data stream from said legacy application to application data names contained in said Form definition language text.

12. The method as in claim 11 further including the step of parsing said developed file for said Form and associating data names of said legacy application with corresponding legacy application data values from a data stream returned from said host, thereby forming data name/data value pairs.

13. The method as in claim 12 further including the step of constructing an HTML object reference to said client, with parameters including said data name/data value pairs and said Form description language text.

14. The method as in claim 13 further including the step of generating an HTML page containing said object reference to said client.

15. The method as in claim 14 further including the step of returning said HTML page to said Web browser program.

16. The method as in claim 1 wherein step c thereof further includes said client parsing said Form description language text parameter passed to it to obtain Constructs containing information relating to data names for said GUI Controls to be displayed.

17. The method as in claim 16 further including for each said Construct that includes a data name, locating a corresponding GUI Control and making an association between said data name and said GUI Control.

18. The method as in claim 17 further including the step of using information from said Form description language text and a data value from a data name/data value list for setting initial state information and contents of said GUI Control.

* * * * *